United States Patent [19]
Beringhause et al.

[11] Patent Number: 5,880,371
[45] Date of Patent: Mar. 9, 1999

[54] PRESSURE TRANSDUCER APPARATUS AND METHOD FOR MAKING

[75] Inventors: Steven Beringhause, Norton; Stanley J. Lukasiewicz, North Attleboro; Charles J. Leedecke, New Bedford, all of Mass.

[73] Assignee: Texas Instruments Incorporated, Dallas, Tex.

[21] Appl. No.: 962,016

[22] Filed: Oct. 31, 1997

Related U.S. Application Data

[60] Provisional application No. 60/036,742 Jan. 27, 1997.
[51] Int. Cl.$^6$ ....................................................... G01L 9/12
[52] U.S. Cl. .............................................. 73/718; 73/724
[58] Field of Search ................... 73/718, 724; 361/283.1, 361/283.3, 283.4

[56] References Cited

U.S. PATENT DOCUMENTS 4,716,492  12/1987  Charboneau et al. ..................... 73/718

*Primary Examiner*—William Oen
*Attorney, Agent, or Firm*—Russell E. Baumann; Richard L. Donaldson; Rene' E. Grossman

[57] ABSTRACT

A fluid pressure responsive capacitive transducer (20) having a lowered manufacturing cost is shown in which a sheet (10) of cast or roll compacted tape material having a selected thickness is partitioned into a multitude of rectangular substrates portions (16) and another sheet (12) having another selected thickness is partitioned into a like number and sized diaphragm portions (18) and are processed in sheet form to apply capacitor plates and associated conductive traces as well as a sealing and spacing glass layer. At least one sheet is then separated into groups, generally comprising one, two or four portions, and pairs of groups of substrates and diaphragms are held together and heated to seal the transducers. Groups of more than one portion of the first and second sheets are then separated into individual transducers.

13 Claims, 2 Drawing Sheets

PRESSURE TRANSDUCER APPARATUS AND METHOD FOR MAKING

This application claims priority under 35 USC § 119(c)(1) of provisional application No. 60/036,742 filed Jan. 27, 1997.

BACKGROUND OF THE INVENTION

This invention relates generally to pressure sensors and more particularly to pressure responsive variable parallel plate capacitive transducers. Such transducers are shown and described, for example, in U.S. Pat. No. 4,716,492, assigned to the assignee of the present invention. In that patent a capacitive pressure transducer is shown having a thin ceramic diaphragm mounted in closely spaced, sealed, overlying relation to a ceramic base, with metal layers deposited on respective opposed surfaces of the diaphragm and base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied fluid pressure. The diaphragm is movable in response to variations in fluid pressure applied to the diaphragm to vary the capacitance of the capacitor in accordance with the changes in applied pressure and the electrical circuit provides an electrical output signal corresponding to the applied pressure.

In order to maximize the economies of mass production to lower the transducer cost and thereby make such transducers economically feasible for a wide number of applications including many previously served by low cost mechanical transducers, a standard size package is selected small enough to be received in a large number of applications yet large enough to provide a reliable signal. The size of the package determines the maximum size of the capacitor plates which, along with the gap between the plates, determines the capacitance signal. This results in limiting the size of the capacitor plates to a smaller size than would be ideal for many applications and relying on the electrical circuit to properly condition the signal. The circuit on the other hand requires a minimum level of capacitance in order to effectively condition the output signal and this in turn affects the size of the gap required between the capacitive plates to produce the minimum capacitance level. In transducers of the type disclosed in the above referenced patent, gaps between plates were in the order of 1–17 microns and more recently gaps in the order of 1–30 microns have been used effectively.

Transducers made in accordance with one of the embodiments described employ a flat diaphragm element secured to a flat base in selectively spaced sealed relation thereto by disposing a layer of a mixture of glass frit including spacing elements such as spheres or rods of a selected diameter between the diaphragm and the base along their peripheries. The glass frit is selected to be fusible at a first temperature at which the spacing elements remain unfused and the mixture is then heated to the fusing temperature of the frit to secure the diaphragm to the base at a spacing therebetween determined by the diameter of the spacing elements.

The diaphragm and base are typically made by taking conventional material, such as alumina, provided in powdered form coated with an organic binder and pressing the material into generally cylindrical configurations of appropriate thicknesses in a die. The diaphragms and bases must then go through a series of screen printing and firing operations to apply the capacitor plates and associated electrically conductive traces and the spacing and sealing glass pattern.

Although the diaphragm and base members are typically processed in batches of thirty or more at a time the individual members must be loaded and aligned into fixtures a number of times during the processing. This results in a labor and/or capital intensive product. Further, in order to obtain consistent, repeatable results from one transducer to another it is important that the diaphragm and base have a high degree of flatness. As a result, the parts particularly the bases, must be subjected to a grinding operation which adds appreciable cost to the finished product.

SUMMARY OF THE INVENTION

It is an object of the present invention to provide a pressure sensing capacitive transducer element which is particularly conducive to low cost manufacture. Another object of the invention is the provision of a pressure responsive capacitive transducer which is easily manufactured and assembled yet is consistent from one device to another. Still another object is the provision of a pressure responsive capacitive transducer which overcomes the prior art limitations noted above and to a method for producing such transducers.

Briefly described, in accordance with the invention, first and second fired rectangular sheets of ceramic, the first having a thickness between approximately 4–60 mils and the second having a thickness between approximately 10–30 mils, are each divided into a plurality of rectangular portions, as by being delineated by a weakened boundary such as by being laser scribed. These sheets are coated with material patterns containing electrically conductive metal on each portion and then heated to fire the metals. A mixture of glass material is coated circumscribing each portion on at least one and preferably both the first and second sheets. The glass material is a mixture of glass frit which fuses at a first selected temperature and spacing elements, such as rods, formed of glass which fuses at a second, higher temperature. The temperature of the glass is then raised to a temperature sufficient to glaze the glass but below the second temperature. After the glass pattern has been applied and glazed, the first and second sheets are broken up into groups preferably of 1, 2 or 4 portions each. Each group of the first sheet is then held together with a respective group of the same number of portions of the second sheet with the conductive pattern of each portion of one sheet aligned with and facing a respective conductive pattern of the other sheet. The groups held together are then heated sufficiently to seal the individual pairs which, after cooling, are then broken apart to form individual pressure responsive capacitive transducers. In a modified process, one sheet, e.g., the sheet intended for use as the diaphragms, are broken into groups with the groups then held against an unbroken sheet, or a sheet broken into larger groups, with the conductive patterns of each portion of the separated groups aligned with and facing respective conductive patterns of the other sheet. After heating sufficiently to create a seal the individual transducers are then broken away. According to a feature of the invention, the second sheet can be formed of ceramic material having a lower coefficient of elasticity than that of the first sheet in order to make the resulting transducers responsive to lower applied pressure ranges while still being thick enough to handle in the unsealed state.

BRIEF DESCRIPTION OF THE DRAWINGS

Other objects, advantages and details of the novel and improved capacitive pressure transducer of the invention and method of making appear in the following detailed description of preferred embodiments of the invention, the detailed description referring to the drawings in which.

DESCRIPTION OF PREFERRED EMBODIMENTS

Figure 1:
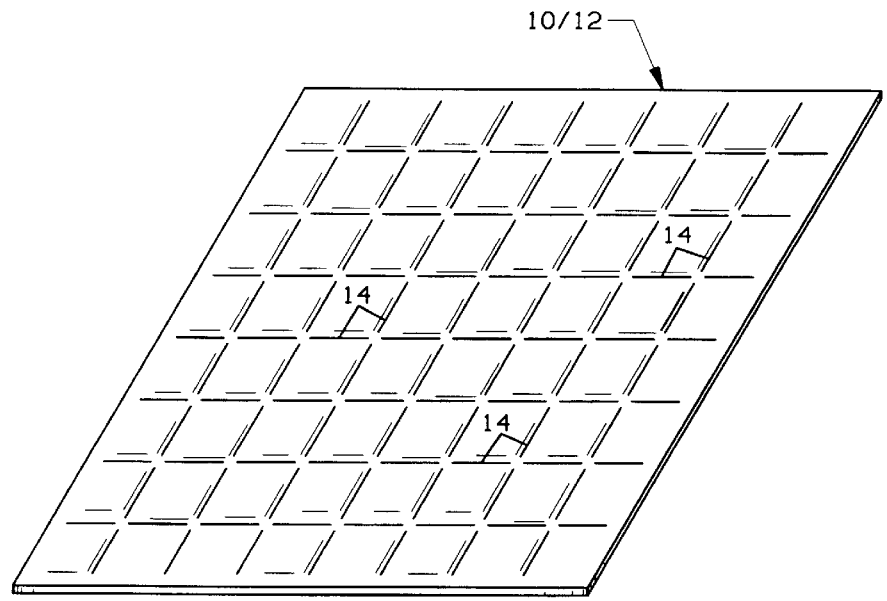
FIG. 1 is a perspective view of a fired cast sheet of ceramic used in making such transducers.
Figure 2:
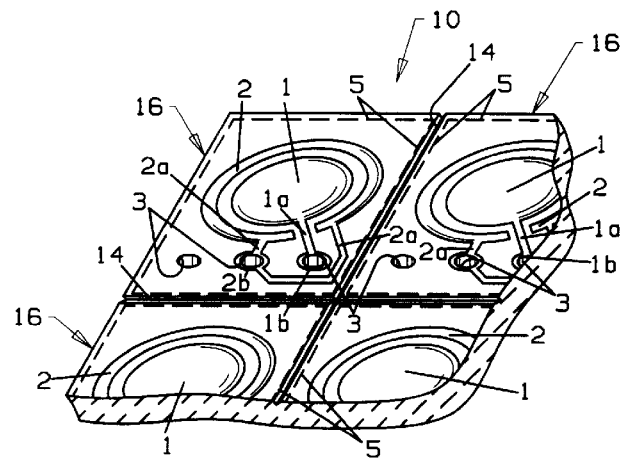
FIG. 2 is a broken away portion of a sheet of the type shown in FIG. 1 having an appropriate thickness to serve as a substrate and shown with selected patterns of electrically conductive material deposited on a surface thereof.
Figure 3:
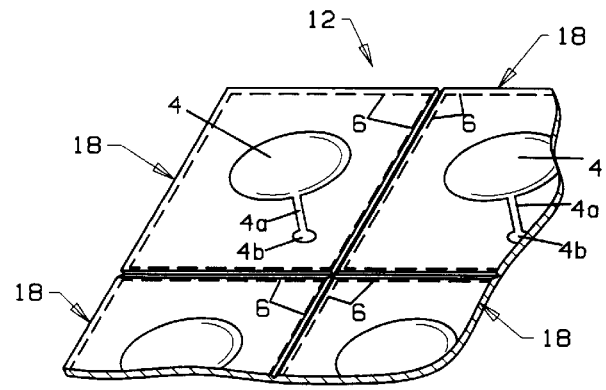
FIG. 3 is a view similar to FIG. 2 but showing a sheet having an appropriate thickness to serve as a flexible diaphragm.

As stated supra, pressure responsive capacitive transducers conventionally comprise a cylindrical substrate and diaphragm which are formed by pressing coated ceramic powder material in individual dies. After firing these ceramic parts a grinding step is typically required in order to provide the necessary flatness so that a consistent gap between the capacitor plates in the finished device will be in the order of 10–30 microns. In accordance with the invention, and with reference to FIG. 1, a fired tape or sheet of ceramic: formed by casting, roll compacting or the like to provide a high aspect ratio of length or width to thickness is shown identified by reference numeral 10/12. Such sheets are readily available in a variety of thicknesses including those thicknesses employed in the instant invention, for making hybrid circuit boards and the like and are therefore are available at relatively low cost. Where the first sheet is to be used for the substrates or bases of the transducers, as shown in FIG. 2, an appropriate thickness of sheet 10 is selected, generally between 4–60 mils. Where the sheet is to be used for the flexible diaphragm, as shown in FIG. 3, an appropriate thickness of sheet 12 is selected, on the order of 10–30 mils. Cast or roll compacted ceramic sheets have the advantage that they become somewhat pliable at firing temperatures and thus conform to the substrate on which the sheet is supported during firing. Thus by providing a flat support during the firing process a sheet can be produced in accordance with an industry standard for camber of 3 mils per inch.

According to a preferred embodiment of the invention, sheets 10/12 are divided into a plurality of essentially equally sized rectangular portions either before or after firing by suitable means, as by laser scribing as indicated by dashed lines 14 to provide weakened boundaries between contiguous portions.

Selected patterns of electrically conductive material, such as gold, are applied to each portion as by printing. As shown in FIG. 2, each substrate portion 16 has a capacitor plate 1 with a trace 1a leading to a terminal pad 1b. A guard ring 2 essentially surrounds each capacitor plate 1 and is provided with a trace 2a leading to a terminal pad 2b. Preferably, each portion 16 is provided with a plurality of bores 3 for receiving therein electrically conductive terminal pins (not shown) in a conventional manner for making electrical connection within respective terminal pads.

Likewise, each portion 18 of sheet 12 has a pattern deposited thereon comprising a capacitor plate 4 with a trace 4a leading to a terminal pad 4b by printing in the same manner as described above for sheet 10.

After printing, sheets 10/12 are heated in a suitable furnace to fire the gold. When the sheets are cooled a glass material is applied as by printing to at least one or both sheets 10/12, along the outer marginal circumference of each portion as indicated by respective dashed lines 5 and 6. It will be understood that the glass pattern could be of any desired configuration, e.g., generally circular as opposed to rectangular as shown, as long as the pattern circumscribes the electrically conductive pattern to effectively seal each transducer. It will be understood that the invention includes vented devices as well as hermetically sealed devices. The glass material is a mixture comprising glass frit which fuses at a first selected temperature and spacing elements, such as rods having a selected diameter, formed of glass which fuses at a second, higher temperature. The glass material is then heated to a temperature below the second temperature to glaze the glass.

Figure 4:
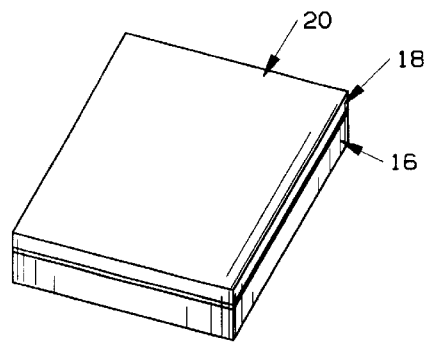
FIG. 4 is a perspective view of an assembled transducer made in accordance with one embodiment of the invention.

According to the first embodiment of the invention, sheets 10/12 are then broken up into groups of portions 16, 18 preferably of one, two or four portions in each group and respective groups are held together with the patterns of portions 16 aligned with and facing the patterns of portions 18 and heated to seal the individual diaphragm portions 18 to respective substrate portions 16 to form completed transducers 20 as shown in FIG. 4. When the group comprises more than one pair as shown at 22 in FIG. 6, the individual transducers are then broken apart. Thus, in accordance with the invention, a multitude of substrates and diaphragms are processed prior to being broken up to thereby greatly lower handling time and simplify associated mounting fixtures. For example, a single sheet can be partitioned into an eight by eight matrix to provide 64 individual portions. Although any rectangular configuration can be employed for the individual portions, it is preferred to form them as squares to optimize use of the surface area of the sheets.

Figure 6:
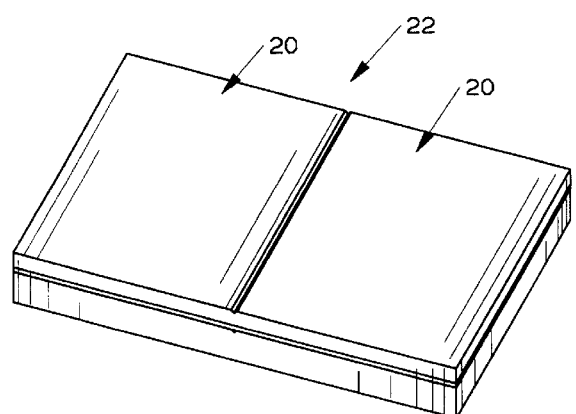
FIG. 6 is a perspective view, similar to FIG. 4, showing a group of two portions assembled and sealed prior to being separated from one another.

As noted above, the groups contain one or more portions of each of sheets 10 and 12. For example, they may contain a single portion, a matrix of one by two, or a matrix of two by two. FIG. 6 shows a group 22 of a one by two matrix after sealing. After cooling, group 22 can be snapped apart to form individual transducers 20. From a handling standpoint it would be desirable to increase the number of portions in a group; however, the inherent camber in the sheet of 2 to 3 mils per inch serves as a practical limitation since a spacing in the order of a mil must be maintained between the capacitor plates on the substrate and diaphragm for the capacitive transducer to function as intended.

Figure 5:
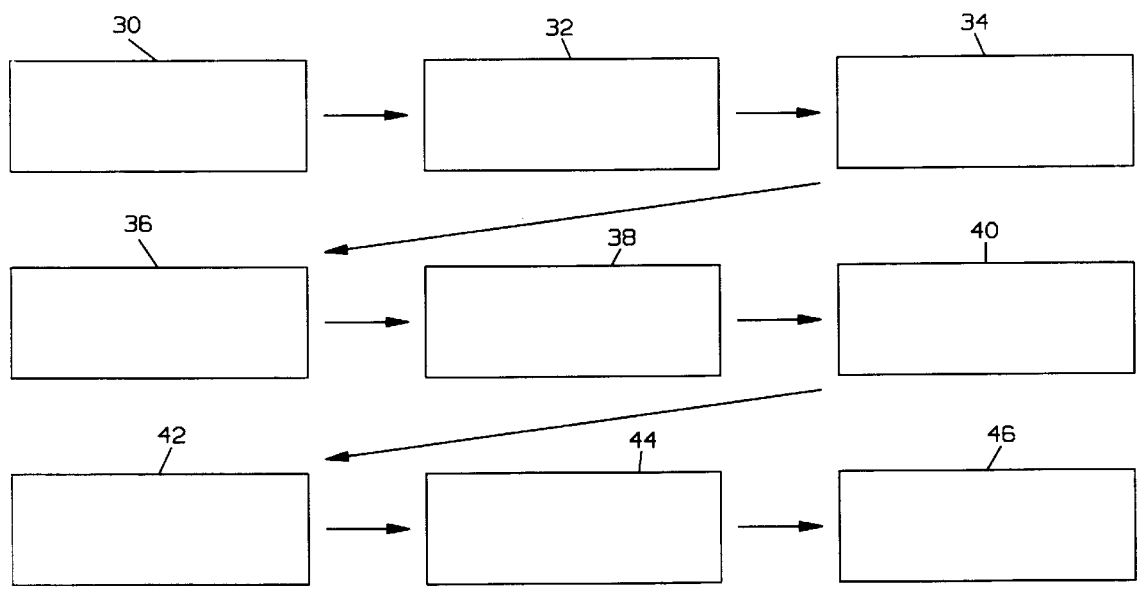
FIG. 5 is a simplified process flow diagram for making the FIG. 4 transducers.

FIG. 5 illustrates in simplified form the processes involved in manufacturing a transducer 20 in accordance with the invention. At step 30 respective fired, scribed sheets 10, 12 of appropriate thickness are selected. A metallization pattern of gold or the like is applied as by printing on sheet 10 for each defined portion 16 at step 32 and a corresponding metallization pattern is applied as by printing on sheet 12 for each defined portion 18 at step 34. Sheets 10 and 12 are then fired at step 36. Sealing and spacing glass patterns are applied as by printing on sheet 10 at step 38 and on sheet 12 at step 40. Sheets 10 and 12 are then heated to glaze the glass at step 42. At step 44 groups of substrate portions 16 and diaphragm portions 18, preferably one, two or four for each group are snapped away from the sheets and then at step 46 the diaphragm portions 18 are sealed to the substrate portions, and then, for those groups containing more than one, the individual transducers are snapped off from the group.

According to a modified embodiment, where it is intended to use the transducers for a relatively low applied fluid pressure, for example, from a first level of approximately 150 psi down to approximately 15 psi, the thickness of sheet 12 is maintained at or near the same thickness as that used for higher pressure devices to facilitate manufacture and handling of the sheet; however, a material having lower modulus of elasticity, i.e., low temperature, coffee ceramic (LTCC) material such as ESL D101, available from ElectroScience Laboratory, a composite made of glass and a ceramic filler such as alumina, is employed. The substrate material can have the same or a different modulus of elasticity as long as it has the same coefficient of thermal expansion as the diaphragm material.

In accordance with an alternative embodiment, one of sheets 10/12, preferably the diaphragm sheet 12, can be broken or separated into groups of one or more following the application of the electrically conductive patterns and the sealing and spacing patterns while leaving the other sheet unbroken or broken into larger groups. The groups of the broken sheet are held against the other sheet so that the electrically conductive patterns and the sealing and spacing patterns of the portions of one sheet are aligned with and facing the respective patterns of the portions of the other sheet and then subjected to heating to seal the transducers. After cooling the individual transducers are then snapped or cut apart. In this way, even with a certain amount of camber in the unbroken sheet, or sheet having larger groups, handling is minimized by sealing groups of portions of the broken sheet to the other sheet without having the camber cause the spacing between the capacitive plates to fall outside the permissible range or adversely affect the seal in individual transducers.

Although the invention has been described using weakened boundaries between the substrate and diaphragm portions it will be realized that, if preferred, the portions can be separated from one another by cutting techniques to thereby obviate the need for such weakened boundaries. Further, it is within the purview of the invention, particularly with improved camber control, for all the portions of each sheet to comprise a group so that the entire first and second sheets are held together and sealed prior to any cutting or breaking procedure. Although glass material is disclosed for spacing and sealing purposes, it is within the scope of the invention to employ other suitable spacing and sealing means, as desired.

It should be understood that though preferred embodiments of the invention have been described by way of illustrating the invention, the invention includes all modifications and equivalents of the described embodiments falling within the scope of the appended claims.

What is claimed:

1. A method of making capacitive pressure transducers comprising the steps of taking a first fired rectangular sheet of electrically insulative ceramic material approximately 40 to 60 mils thick with a plurality of equally sized rectangular portions being delineated by a boundary between contiguous portions, taking a second fired, rectangular sheet of electrically insulative ceramic material approximately 10–30 mils thick with a like number of and sized portions delineated by a boundary between contiguous portions, applying a first selected pattern of electrically conductive metal on a surface of each portion of the first sheet and second selected pattern of electrically conductive metal on a surface of each portion of the second sheet, firing the conductive metals on the first and second sheets, applying around the pattern of electrically conductive metal on each portion on at least one of the first and second sheets a pattern of a glass frit fusible at a first temperature and containing spacer elements of glass fusible at a second, higher temperature, raising the temperature of the glass sufficiently to glaze the glass frit but below the second temperature, separating at least one of the sheets into groups of portions, placing and holding a group of portions of the second sheet on a corresponding group of portions of the first sheet with the conductive patterns of the second sheet aligned with and facing the respective conductive patterns of the first sheet and raising the temperature of the aligned and held portions to a temperature between the first and second temperatures to seal each second sheet portion to a respective first sheet portion.

2. A method according to claim 1 in which at least one sheet is separated into groups of portions prior to sealing.

3. A method according to claim 2 in which each group of the first sheet and each group of the second sheet comprises a single portion.

4. A method according to claim 2 in which each group of the first sheet and each group of the second sheet comprises two portions.

5. A method according to claim 2 in which each group of the first sheet and each group of the second sheet comprises four portions.

6. A method according to claim 1 in which the first sheet is formed of ceramic material having a selected modulus of elasticity and the second sheet is formed of a ceramic material having a selected modulus of elasticity lower than that of the first sheet.

7. A method of making pressure responsive capacitive transducers comprising the steps of taking a first fired rectangular sheet of electrically insulative ceramic material approximately 40 to 60 mils thick, taking a, second fired, rectangular sheet of electrically insulative ceramic material approximately 10–30 mils thick, applying a plurality of a first selected pattern of electrically conductive metal on a surface of the first sheet and a plurality of a second selected pattern of electrically conductive metal on a surface of the second sheet, firing the conductive metals on the first and second sheets, fixing the first sheet to the second sheet with the plurality of the first selected pattern facing in spaced apart relation to and aligned with the plurality of the second selected pattern, and separating pairs of portions of the first and second sheets each having a single first and second selected pattern of electrically conductive material.

8. A method according to claim 7 in which the first and second fired rectangular sheets have weakened boundaries delineating a plurality of like sized rectangular portions in each sheet and a single respective pattern of electrically conductive material is applied to each rectangular portion.

9. A method according to claim 8 further comprising, prior to fixing the first sheet to the second sheet, the steps of applying to at least one of the first and second sheets circumscribing each pattern of electrically conductive metal a pattern of glass frit fusible at a first temperature and containing spacer elements of glass fusible at a second higher temperature and raising the temperature of the glass sufficiently to glaze the glass frit but below the second temperature.

10. A pressure responsive capacitive transducer comprising a relatively thick, rigid, essentially planar substrate formed of electrically insulative ceramic material having a rectangular configuration and a relatively thin, flexible, essentially planar diaphragm formed of electrically insulative ceramic material having a configuration matching that of the substrate, a pattern of electrically conductive material attached to a surface of the substrate, another pattern of electrically conductive material attached to a surface of the diaphragm, the diaphragm disposed on the substrate with the electrically conductive layers aligned with and facing one another and a layer of spacing and sealing material interposed between the diaphragm and the substrate at least partially circumscribing the patterns of electrically conductive material to secure the diaphragm to the substrate in sealed, spaced apart relationship.

11. A pressure responsive capacitive transducer according to claim 10 in which the substrate is formed of material having a selected modulus of elasticity and the diaphragm is formed of material having a lower modulus of elasticity.

12. A pressure responsive capacitive transducer comprising a relatively thick, rigid, essentially planar substrate formed of electrically insulative ceramic material having a selected modulus of elasticity and a relatively thin, flexible, essentially planar diaphragm formed of electrically insulative ceramic material having a lower modulus of elasticity than the selected modulus of elasticity, a pattern of electrically conductive material attached to a surface of the substrate, another pattern of electrically conductive material attached to a surface of the diaphragm and the diaphragm being fixed to the substrate with the patterns of electrically conductive material aligned with, facing and spaced from one another.

13. A pressure responsive capacitive transducer according to claim 12 in which the diaphragm has a thickness in the order of 10–30 mils.

* * * * *